UNITED STATES PATENT OFFICE.

CARL KLINGBIEL, OF BIEBRICH, GERMANY.

PROCESS FOR THE MANUFACTURE OF POTASSIUM AND SODIUM SALTS FROM KELP-ASHES.

1,162,617.  Specification of Letters Patent.  Patented Nov. 30, 1915.

No Drawing.  Application filed October 3, 1914. Serial No. 864,948.

*To all whom it may concern:*

Be it known that I, CARL KLINGBIEL, a citizen of the German Empire, residing at Biebrich a. Rh., in the Kingdom of Prussia, Germany, have invented certain new and useful Improvements in the Process for the Manufacture of Potassium and Sodium Salts from Kelp-Ashes, of which the following is a specification.

The method hitherto in use to extract from kelp-ashes the potassium and sodium salts and iodin has many defects. The separation of potassium and sodium salts is imperfect; considerable quantities of potassium are lost in the final mother-liquors containing the iodin. The rest of the liquor, from which the iodin is to be extracted, is of a large volume, which makes difficult the extraction of the iodin. The potassium partly forms potassium sulfate; the sodium chlorid appears associated with potassium carbonate and is almost useless. Potassium sulfate and alkaline sodium chlorid are undesirable bodies. It was found, that these imperfections are mainly due to the presence of potassium carbonate, sulfid, sulfite, and thiosulfate. These compounds, which accumulate in the liquor of the ashes, prevent a part of the potassium and sodium from crystallizing and increase the boiling-point of the liquor. It was now found, greatly to simply and improve the separation of the potassium- and sodium-salts, as well as the extraction of the iodin, by the addition of phosphoric acid in excess to the saturated liquor of the ashes. Through the excess of the phosphoric acid the carbonates, sulfids, sulfites and thiosulfates are destroyed. When the action of the phosphoric acid has ceased, the excess of that acid will be neutralized by the addition of a suitable alkali until neutrality, as indicated by methyl-orange, has been reached. The liquor thus obtained shows a quite different behavior on crystallizing after evaporating, as such obtained by the old method. The formation of potassium sulfate no more takes place, but the $SO_4$-ion becomes removable as sodium sulfate. The neutralized liquor is boiled down, the potassium-salts are allowed to crystallize out on cooling and the sodium-salts are separated from the hot solution. This way of separation may be extended much farther, than usual hitherto and a final liquor will be obtained very rich in iodin and of a much smaller volume, from which to extract the iodin by chlorin is much simpler and cheaper. The mother-liquor, colored brown by the iodin, still contains valuable potassium. In order to obtain this and the remaining iodin, the mother-liquor and the washing-waters from the iodin are used for dissolving fresh lots of kelp-ashes, by which methods the iodin will be at once fixed by the sulfids and thiosulfates of the ashes.

This process does not allow any loss of potassium; the sodium-salts are obtained quantitatively and free of alkali-metal carbonate, thus they become more suitable for further industrial applications. The liquors show a lower boiling point; the separation of the potassium- and sodium-salts is much easier. The phosphoric acid is totally bound to the potassium and increases the value of the potassium-salts very considerably for manuring purposes.

I claim:

The herein described process of extracting potassium and sodium salts from kelp ashes in solution, which consists in adding to the solution an excess of phosphoric acid to destroy the thiosulfates and neutralizing the excess of phosphoric acid by the addition of an alkali.

In testimony whereof I have hereunto set my hand in presence of two subscribing witnesses.

CARL KLINGBIEL.

Witnesses:
JAKOB KEFFER,
HERMANN KLINGBIEL.